United States Patent [19]
Snyder

[11] Patent Number: 5,867,327
[45] Date of Patent: Feb. 2, 1999

[54] PROCESS FOR MANUFACTURING CYLINDRICAL MICROLENSES

[75] Inventor: James J. Snyder, Soquel, Calif.

[73] Assignee: Blue Sky Research, San Jose, Calif.

[21] Appl. No.: 839,124

[22] Filed: Apr. 23, 1997

[51] Int. Cl.$^6$ .............................................. C03B 37/025
[52] U.S. Cl. .............................. 359/710; 65/61; 65/404; 65/437; 65/475; 359/720
[58] Field of Search ................... 359/710, 708, 359/720; 65/61, 64, 102, 404, 437, 475

[56] References Cited

U.S. PATENT DOCUMENTS

| | | | |
|---|---|---|---|
| 3,879,182 | 4/1975 | Strack | 65/37 |
| 3,989,495 | 11/1976 | Siegmund | 65/31 |
| 4,391,621 | 7/1983 | Siegmund | 65/31 |
| 4,578,097 | 3/1986 | Berkey | 65/403 |
| 4,932,989 | 6/1990 | Presby | 65/387 |
| 5,080,706 | 1/1992 | Snyder et al. | 65/102 |
| 5,081,639 | 1/1992 | Snyder et al. | 372/101 |
| 5,155,631 | 10/1992 | Snyder et al. | 359/708 |
| 5,181,224 | 1/1993 | Snyder et al. | 372/101 |
| 5,338,327 | 8/1994 | Ohga et al. | 65/414 |

*Primary Examiner*—Stanley S. Silverman
*Assistant Examiner*—Sean Vincent
*Attorney, Agent, or Firm*—LaRiviere, Grubman & Payne, LLP

[57] ABSTRACT

Method for manufacturing cylindrical microlenses having exceptional optical properties, and the lenses manufactured according to the process. According to the present invention, a method is provided for fabricating cylindrical microlenses, the method comprising the steps of forming a glass preform by means of grinding at least one face thereof in the direction transverse to longitudinal axis of the lens, the preform having the shape of a cylindrical lens, and drawing the glass preform to reduce its cross-sectional dimensions while retaining its cross-sectional shape, thereby providing a cylindrical microlens with a high numerical aperture or other desirable characteristics. The drawing step may be facilitated by means of the application of heat to the preform. Further, the preform may be roughly formed to a shape intermediate to its finished form by casting, sintering, extruding, or other glass forming methodology.

18 Claims, 3 Drawing Sheets

PROCESS FOR MANUFACTURING CYLINDRICAL MICROLENSES

TECHNICAL FIELD

The present invention relates to the manufacture of optical lenses. More specifically, the present invention teaches an improvement in the methodology for manufacturing cylindrical microlenses which results in significant improvements to the optical characteristics thereof, and the microlenses manufactured according to this method.

BACKGROUND OF THE INVENTION

The present inventions relates to cylindrical lenses as taught in U.S. Pat. Nos. 5,080,706; 5,081,639; 5,155,631; and 5,181,224. The preceding United States patents are herewith incorporated by reference.

Each of the incorporated references teaches a cylindrical lens, and more particularly a cylindrical microlens. As used herein a cylindrical microlens is defined as a cylindrical lens wherein measurements of the X and Y axes thereof are in the range of approximately 50 microns to 1000 microns. U.S. Pat. No. 5,080,706 provides a diffraction limited, high numerical aperture microlens (a fast cylindrical microlens) which is particularly suitable for use in the CIRCULA-SER™ laser diode available from Blue Sky Research of Santa Cruz, Calif. As taught therein, for many applications the curves of the cylindrical lens may be of specific shapes quite different from circular curves or flat planes. The required shape, while it might be flat or circular, could also incorporate a non-circular curve such as an elliptic or hyperbolic. In other words, cylindrical lenses taught in the incorporated references may be formed with a variety of curved surfaces, and the exact shape chosen therefor is highly dependent upon the optical application in which the microlens is intended to be used.

Diffraction limited surfaces can be manufactured on large scale cylindrical optics (i.e., greater than 5 mm) with low numerical apertures (0.1 or less) by conventional grinding and polishing techniques. However conventional grinding and polishing techniques are unable to produce optical quality cylindrical lenses of higher numerical aperture (N.A.). For small microlenses (i.e., less than or equal to 1 mm) other techniques have been developed. Microlenses have been manufactured using photosensitive glass, graded index glass, and computer-generated diffractive optics or kinoforms. None of these techniques has been able to produce a diffraction limited cylindrical lens with high numerical aperture.

In fabricating microlenses from photosensitive glass, a mask is first deposited on the glass, and the material outside the desired lens is exposed to light. When the glass is subsequently heated, the exposed material expands its volume, and the unexposed lens region is compressed. The compression causes the lens region to bulge, forming a simple lens.

Graded index microlenses are formed by diffusing index-changing material into glass. The diffusion process yields an index of refraction that varies smoothly from the lens center to the edge. The graded index focuses the light much as a conventional lens does.

In a binary diffractive optic or computer-generated kinoform, the surface of a glass plate is etched according to a pattern generated by computer. The etched surface is designed to diffract light to a focal point, so that it performs like a conventional lens.

Cylindrical microlenses fabricated from photosensitive glass and graded index planar microlenses can be produced inexpensively in quantity, but these single optical elements are limited to numerical apertures of 0.25 to 0.32, and furthermore they cannot be corrected for spherical aberration. Diffractive optic kinoforms can be corrected for aberrations, but efficient kinoform lenses with numerical apertures approaching 0.5 require the use of sub-quarter-micron lithography, which is currently beyond the state of the art.

Optical fibers with a circular cross-section have been used for cylindrical lenses. Optical fiber is inexpensive and readily available. However, circular optical fibers are not corrected for spherical aberration; i.e., such optical fibers are not diffraction limited.

Cylindrical microlenses have been utilized for integrated optics, for focusing laser diode bars, and also to shape the beam of single-mode laser diodes, as in the previously discussed CircuLaser™. In integrated optics, carefully designed cylindrical microlenses efficiently and conveniently couple light into or out of narrow waveguides, or any narrow slit.

The incorporated references disclose cylindrical microlenses manufactured by "pulling" a preform in similar fashion to the manner in which optical fibers are pulled. The preform itself may be formed by a number of methodologies, but the most commonly utilized technologies for such manufacture are grinding the preform from a billet of optical glass and casting the preform in a mold from a mass of molten optical glass.

The incorporated references do not address the problem of light scattering caused by tool marks left in the preform as a result of the manufacturing process. Hence to effect the manufacture of preforms, one skilled in art would be inclined to utilize longitudinal grinding of either the preform itself or of the mold from which the preform is cast.

Having reference to FIG. 1, a first conventional grinding technology consists of grinding at least one non-flat surface, 10, along glass preform, or boule, 1 in the longitudinal direction, 5. According to this methodology, a substantially flat grinding wheel 20, is mounted on a numerically controlled universal grinder, such as the Model 1632 CNC cylindrical grinder with an optional CNC programmable workhead for non-round grinding, available from Weldon Machine Tool of York, Pa. In this manner, the lens is ground by a succession of longitudinal passes which ultimately form the desired lens face profiles.

A second prior fabrication methodology is shown in FIG. 2. Having reference to that figure, a non-flat grinding wheel 21 is mounted in the previously discussed grinding apparatus in order to grind surface 10 into preform 1. In this embodiment, the negative of desired lens profile is first formed as surface 22 of grinding wheel 21. As wheel 21 is applied to preform 1, again in the longitudinal direction, surface 22 of grinding wheel 21 imparts the profile of lens surface 10 to preform 1. In this case, CNC grinding is not required, as the lens is ground by at least one, and preferably a succession of longitudinal passes which ultimately form the desired lens face profiles.

All grinding of lenses introduces tool marks. Each of the previously discussed longitudinal grinding methodologies induce tool marks which are formed along the lens's longitudinal axis. These longitudinal tool marks have been found to be persistent: they remain even after the lens is heated and pulled to its final size. These relics of longitudinal grinding cause scattering and reduced optical efficiency. In extreme cases, they can cause aberrations to the beam formed by the lens, or shadows in the beam. Moreover, the application of longitudinal grinding to molds wherefrom preforms are cast presents similar limitations. Longitudinal grinding of the molds results in longitudinal tool marks which transfer to the resultant preform.

Transversely grinding the preform, or the mold from which the preform is cast, would eliminate these longitudinal tool marks. However, such transverse grinding of cylindrical lenses, their preforms, or the molds from which cast introduces corresponding transverse tool marks in the lens which have similar detrimental effects on optical performance as the previously discussed transverse tool marks. Moreover, the transverse grinding of cylindrical lenses is well known to have several additional deleterious effects. First, the actual number of tool marks, per unit length of lens, increases with transverse grinding. Second, transverse grinding of optical lenses is somewhat more limited in the shapes which are attainable using this methodology. Such shapes can generally be limited to convex shapes and relatively long-radii concave surfaces. Finally, transverse grinding is more expensive than longitudinal grinding.

What is required then, is a methodology for forming a microlens from a preform wherein the resultant microlens is without tool marks. Specifically, what is needed is a methodology for forming microlenses by first forming a preform without longitudinally grinding it, or the mold from which it was cast, then heating the preform, and pulling the preform to the required size of the microlens.

DISCLOSURE OF INVENTION

The present invention provides a method for making a diffraction limited, high numerical aperture (fast) non-circular cylindrical microlens of exceptional optical properties. The method taught herein is adaptable to produce a cylindrical lens that has substantially any convex optical shape and many concave optical shapes formed on either or both of its optical surfaces, with a numerical aperture as high as 1.5. The cylindrical lens may be diffraction limited over its numerical aperture. In some embodiments, the cylindrical lens may have a curved optical surface that has the shape of a hyperbola, or in other embodiments it may have the shape of an ellipse. In still other embodiments, the cylindrical lens may have some other shape designed to transform some particular given input light distribution into some desired output light distribution.

Cylindrical microlenses having exceptional precision and refinement of optical properties are required by some applications. To form these extremely precise microlenses, a number of formation methodologies were attempted, in accordance with the incorporated references, each of which teach that the desired shape is first formed in a glass preform that is large relative to the final product. The methodology taught by the references is to "conventional grinding techniques". Indeed, at the time those inventions were made, it was implicitly assumed that any grinding technique would result in lenses of acceptable quality for all applications. As has been discussed, that has not proven true in the most demanding applications. Each of the discussed conventional grinding techniques, which utilize longitudinal grinding of the preform either failed to produce preforms of acceptable surface quality and accuracy, or failed to produce them reliably and routinely. For some especially critical applications, it was found that substantially any longitudinal grinding of the preform resulted in unacceptable longitudinal tool marks in the preform.

By way of experimentation, a glass preform was made by grinding the preform in the transverse direction, even though prior experience and conventional wisdom leads those of ordinary skill in the art to believe that such formation would result in the previously discussed shortcomings relating to the longitudinal grinding of cylindrical lenses, namely: deleterious optical effects substantially similar in nature and scope to the negative effects of longitudinal grinding; density of tool marks in the transverse direction at least equal to that of tool marks which would be formed in the longitudinal direction by grinding in that direction; increased cost; and limitations on the resultant shape.

After formation of this transversely ground preform, or boule, it was heated to the minimum drawing temperature and a microlens of the desired dimensions was drawn from it. The cross-sectional shape of the glass remained constant as it was drawn. As a result, the cross-sectional dimensions became smaller and smaller, while the shape remained the same. As an additional advantage, during the drawing process, the surfaces of the cylindrical lens become optically smooth due to fire polishing which, it is believed, results from surface tension induced by heating the preform. Moreover, this fire polishing displays a surprising result relating to the formation of microlenses from a transversely ground preform: the fire polishing is an asymmetrical process! In other words, the fire polishing resulting from heating and drawing the preform selectively removes transverse tool marks while leaving in place longitudinal tool marks.

Accordingly, the present invention teaches a method whereby longitudinal tool marks are eliminated by the simple expedient of their never having been created, while simultaneously eliminating transverse tool marks by means of drawing and fire-polishing the preform/lens in the drawing step. It is believed that the drawing step eliminates the transverse tool marks by virtue of significantly lengthening them along the lens axis to the point where they become imperceptible.

Each glass preform has a cylindrical cross section that comprises at least a first optical surface, and generally at least a second optical surface. The cross-section is constant along the cylindrical or longitudinal axis of the lens. By way of example, but not limitation, the glass preform could comprise a first surface having a flat shape, and a second surface having a curved shape. Alternatively, the glass preform could be formed such that both the first and second surfaces thereof comprise a curved shape.

The specific cross-sectional shape of the preform is of course highly dependent upon the desired application of the cylindrical lens that will be formed from it. The shape of the preform is substantially retained throughout the drawing process, and therefore the cross-sectional shape of the preform chosen to transform some particular given input light distribution into some desired output light distribution in the final cylindrical microlens. In some embodiments, either or both optical surfaces of the preform may have the shape of a hyperbola, or in other embodiments either or both surfaces may have the shape of an ellipse.

Alternatively, and to overcome at least some of the costs and preform shape limitations attendant upon transverse grinding, the advantages of the present invention may be realized by two preform formation methodologies utilizing casting. In a first cast preform methodology, the preform is cast with sufficient accuracy to enable it to be heated and drawn directly into the desired cylindrical microlens without resorting to other fabrication operations. As a second casting alternative, the preform may be first molded in a shape approximate to the finished preform, and then finished by grinding in the transverse direction. In this molding process, the preform is first molded to a desired intermediate shape using conventional casting means prior to transverse grinding. As a further alternative this intermediate form may be formed by extruding, sintering, or other glass forming technologies well known to those of ordinary skill in the art.

It should be noted that, as used herein, a preform comprises one or more surfaces equivalent to a corresponding one or more optical surfaces of a cylindrical microlens. These equivalent surfaces may be formed by directly grinding them in the preform, may be formed by grinding their reverse image in a mold from which the preform is cast, and may further be ground on an intermediate form. As used herein, this intermediate form could be formed by casting a preform to an approximate shape, and then finally grinding the preform to a desired finished shape.

Equivalent surfaces in the preform have the same shape as the microlens which will ultimately be drawn from that preform, except of course for a scale factor. These equivalent surfaces would perform optically in substantially the same manner in some applications as the optical surface of the microlens, were the tool or grinding marks removed from the equivalent surface, and the resultant surface thus polished. The act of drawing the microlens from the preform not only reduces the preform to a microlens having a desired size, but also differentially polishes all transverse grinding or tool marks while retaining the optical characteristics determined by the shape of the preform.

In summary, the present invention teaches manufacturing a cylindrical microlens according to the following method: forming a preform by a method which eliminates the longitudinal grinding of the preform and then heating and drawing the preform to form the desired microlens. A first methodology consists of at least grinding the preform in a direction transverse to the longitudinal axis of the lens, and then heating and drawing the preform to remove the transverse tool marks formed by the grinding operation while concurrently drawing the preform to the size of the desired microlens. Other alternative utilize casting or otherwise forming the preform to at least a semblance of its desired final shape. One casting methodology minimizes the amount of optical grinding required by casting the preform to a rough approximation of its finished dimensions and then grinding it to the desired final shape. Alternatively, the preform may be cast in its final shape and drawn.

The combination of forming the preform without longitudinal grinding, for instance by transversely grinding the preform, coupled with drawing the preform to the size required of the microlens results in cylindrical microlenses of exceptional optical properties, and substantially without longitudinal or transverse tool marks. Also taught by the present invention are the cylindrical microlenses manufactured according to the method taught herein.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing in the following detailed description of the Best Mode of Carrying Out the Invention. In the drawing.

Figure 1:
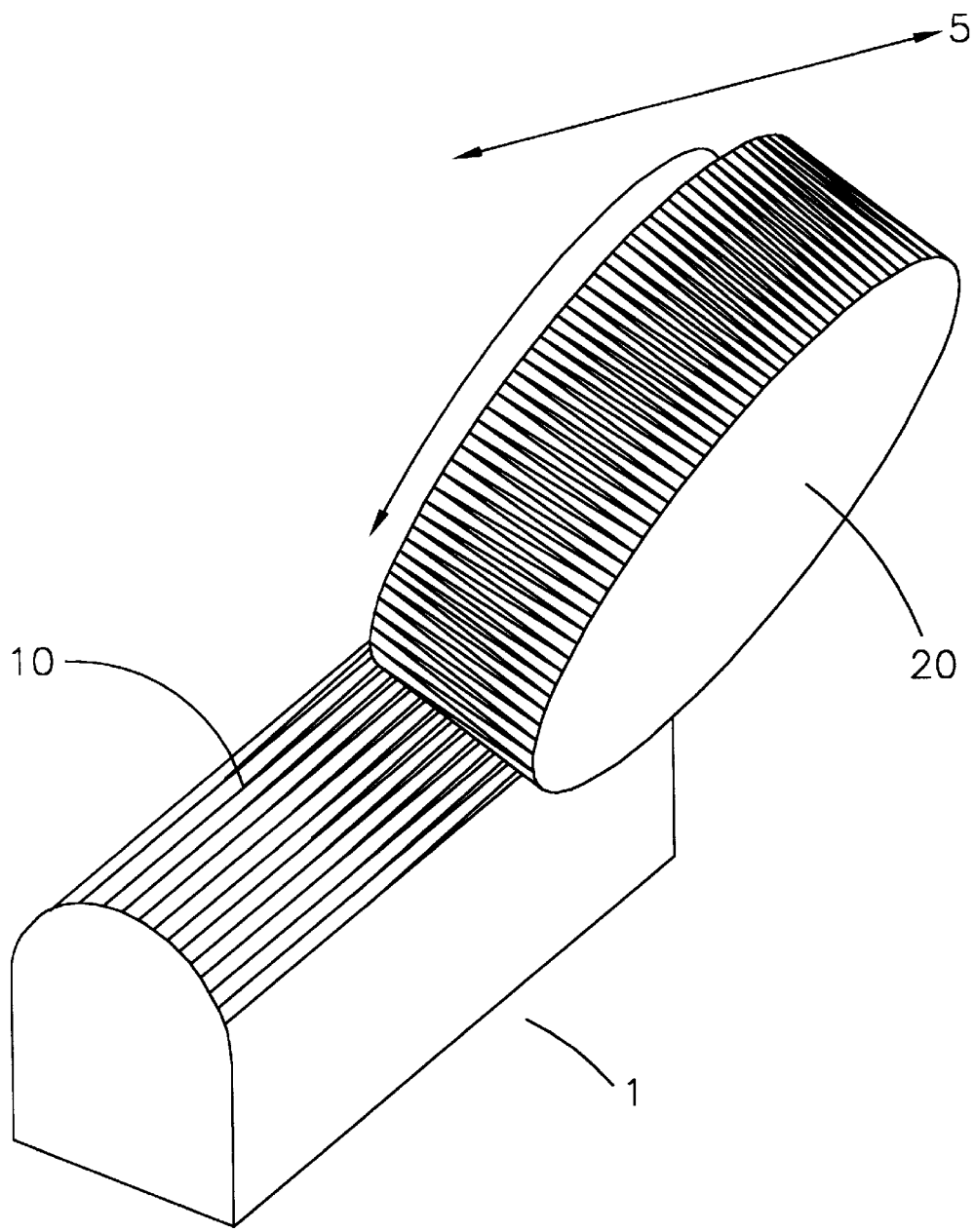
FIG. 1 is a first preform manufacturing methodology.
Figure 2:
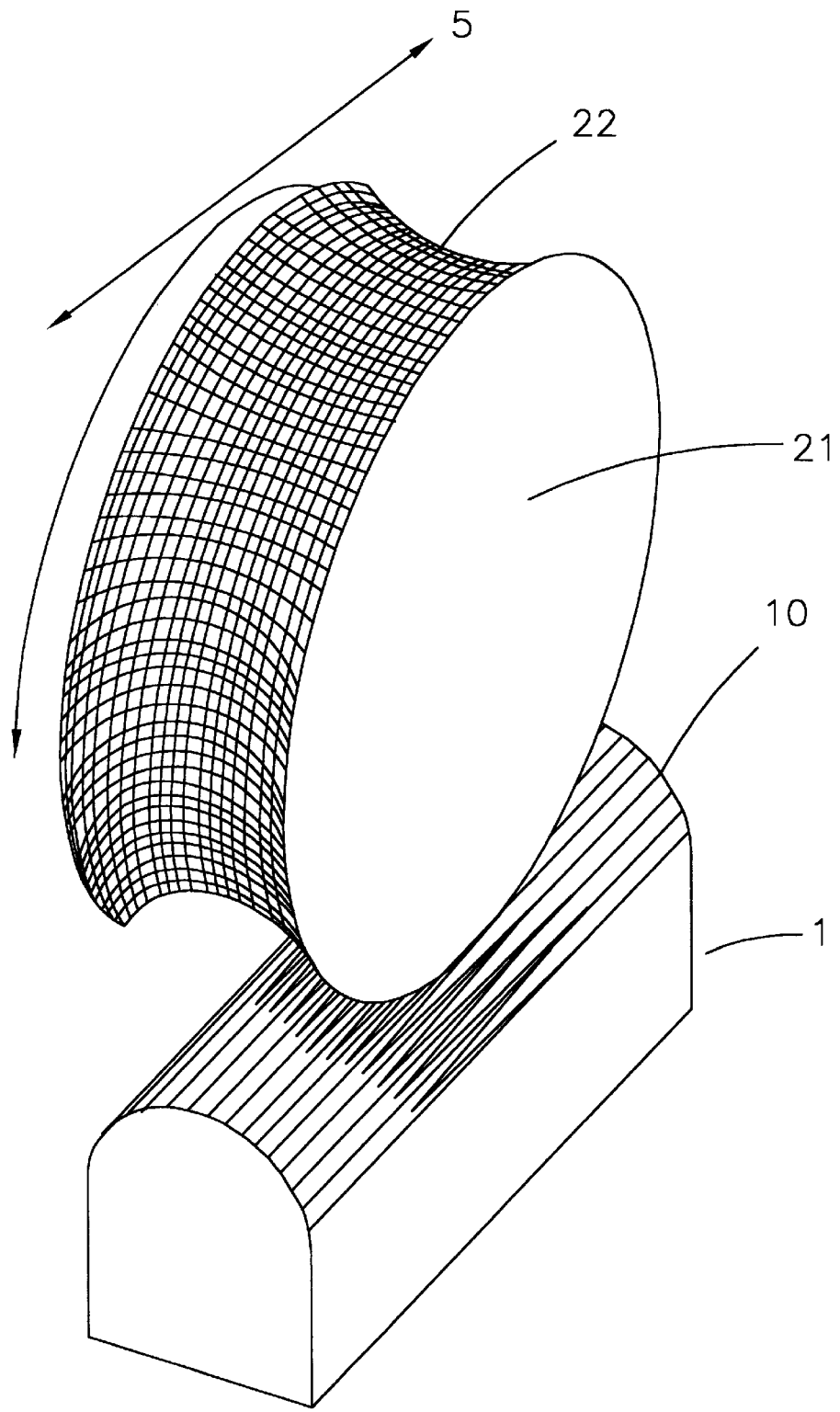
FIG. 2 is a second preform manufacturing technology.

Reference numbers refer to the same or equivalent parts of the invention throughout the several figures of the drawing.

BEST MODE OF CARRYING OUT THE INVENTION

According to the present invention, a method is provided for fabricating cylindrical microlens, the method comprising the steps (a) forming a glass preform by means of grinding at least one face thereof in the direction transverse to longitudinal axis of the lens, the preform having the shape of a cylindrical lens, and (b) drawing the glass preform to reduce its cross-sectional dimensions while retaining its cross-sectional shape, thereby providing a cylindrical microlens with a high numerical aperture or other desirable characteristics. Drawing step (b) may be facilitated by means of the application of heat to the preform. Further, the preform may be roughly formed to a shape intermediate to its finished form by casting, sintering, extruding, or other glass forming methodology well known to those of ordinary skill in the art.

Figure 3:
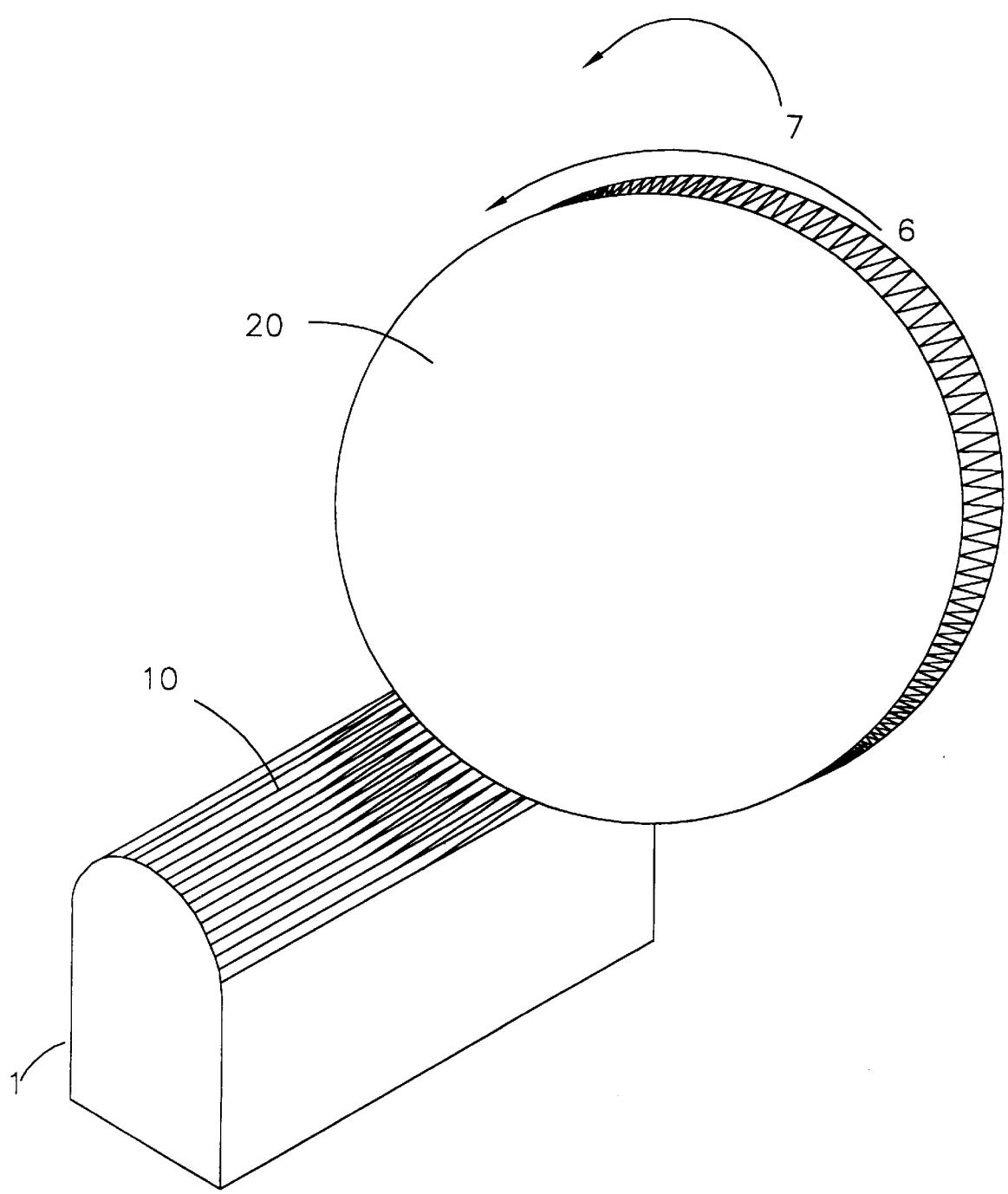
FIG. 3 is a diagrammatic representation of the transverse preform manufacturing technology according to the principles of the present invention.

Referring now to FIG. 3, an example of transverse grinding of the optical preform is shown. Having reference to that figure, surface 10 of preform 1 is formed by grinding the profile in the direction, 7, transverse to the longitudinal axis of the preform by means of abrasive wheel 20 rotating as shown at 6. In the preferred embodiment, a numerically controlled universal grinder, such as the model 1632 CNC Cylindrical Grinder with an optional CNC programmable workhead for non-round grinding, available from Weldon Machine Tool of York, Pa., is used to form the preform 20 by the discussed transverse grinding methodology. The glass preform may be ground from a circular glass rod, for instance SF2, which is commercially available from Schott Glass of Duryea, Pa. Using the universal grinder, the rod is formed into the desired preform shape; thus the glass preform can comprise an infinite variety of shapes.

After the preform is thus finished, it is drawn into the final desired sized using the drawing techniques taught in at least one of the incorporated references.

While the preferred embodiment of the present invention contemplates the formation of preforms, and hence microlenses, from glasses, it will be obvious to those of ordinary skill in the art that alternative materials possessing the requisite optical and mechanical characteristics for a given application may either exist or become available in future. Accordingly, the principles of the present invention contemplate the utilization of a variety of optical materials including, but not necessarily limited to glasses, polymers, monomers, and various man-made and naturally occurring crystalline structures in the formation of preforms, and hence microlenses.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, the principles of the present invention specifically contemplate the formation of one or more optical faces having a variety of shapes including flat, circular, hyperbolic, elliptical, parabolic, and combinations of the foregoing. Furthermore, the present invention may be implemented using alternative preform materials, grinding technologies, and grinding wheel geometries. Each of these alternatives is specifically contemplated by the principles of the present invention. The invention disclosed herein may be practiced without any element which is not specifically disclosed herein.

What is claimed is:

1. A cylindrical microlens drawn from a ground preform having a curved optical surface free from longitudinal tool marks and a longitudinal axis, the cylindrical microlens formed by the process of:

forming a preform by the grinding of a first surface on a preform, the preform having a longitudinal axis equivalent to the longitudinal axis of the cylindrical microlens and a first surface equivalent to the curved optical surface of the cylindrical microlens, the grinding being performed exclusively in a direction substantially transverse to the longitudinal axis of the preform without producing longitudinal tool marks; and drawing the preform to form the cylindrical microlens having the cross-sectional shape of the preform, but with cross-sectional dimensions reduced below the cross-sectional dimensions of the preform, whereby the step of drawing the preform selectively removes transverse tool marks left by the step of forming.

2. The cylindrical microlens of claim 1 formed by the further step of heating the preform prior to effecting the step of drawing.

3. The cylindrical microlens of claim 1 wherein the step of forming further comprises the grinding of the first surface on an intermediate form.

4. The cylindrical microlens of claim 1 formed of a material selected from the group consisting of: glasses, crystals, resins, polymers, and monomers.

5. The cylindrical microlens of claim 1 including a plurality of optical surfaces, at least one of the plurality of optical surfaces being a curved optical surface, the process comprising the further step of:

forming a preform by the grinding of each of a plurality of surfaces on the preform, the plurality of surfaces on the preform equivalent to the plurality of optical surfaces of the cylindrical microlens, the grinding being performed exclusively in a direction substantially transverse to the longitudinal axis of the preform.

6. A cylindrical microlens drawn from a ground preform having a curved optical surface free from longitudinal tool marks, a longitudinal axis, and a desired final size, the cylindrical microlens formed by the process of:

forming a preform by the grinding of a first surface on an optical glass preform, the preform having a longitudinal axis equivalent to the longitudinal axis of the cylindrical microlens and a first surface equivalent to the curved optical surface of the cylindrical microlens, the grinding being performed exclusively in a direction substantially transverse to the longitudinal axis of the preform; and heating the preform to its minimum drawing temperature; and selectively removing any transverse tool marks remaining after the step of forming by drawing the preform into the cylindrical microlens having the desired final size.

7. The cylindrical microlens of claim 6 including a plurality of optical surfaces, at least one of the plurality of optical surfaces being a curved optical surface, the process comprising the further step of:

forming a preform by the grinding of each of a plurality of surfaces on the preform, the plurality of surfaces on the preform equivalent to the plurality of optical surfaces of the cylindrical microlens, the grinding being performed exclusively in a direction substantially transverse to the longitudinal axis of the preform.

8. A method for forming a cylindrical microlens having a curved optical surface and a longitudinal axis, the method comprising the steps of:

forming a preform by the grinding of a first surface on said preform, said first surface equivalent to said curved optical surface, said grinding being performed exclusively in a direction substantially transverse to the longitudinal axis of said preform, said longitudinal axis of said preform equivalent to said longitudinal axis of said cylindrical microlens; and drawing said preform to form said cylindrical microlens having the cross-sectional shape of said preform, but with cross-sectional dimensions reduced below the cross-sectional dimensions of said preform, whereby said step of drawing said preform selectively removes transverse tool marks left by said step of forming.

9. The method of claim 8 applied to a cylindrical microlens having a plurality of optical surfaces, at least one of said plurality of optical surfaces being a curved optical surface, wherein said step of forming a preform further comprises the grinding each of a plurality of surfaces on said preform, said plurality of surfaces on said preform equivalent to said plurality of optical surfaces of said cylindrical microlens, said grinding being performed exclusively in a direction substantially transverse to said longitudinal axis of said preform.

10. The method of claim 1 comprising the further step of heating said preform to its minimum drawing temperature prior to said step of drawing said preform.

11. The method of claim 1 wherein said step of forming a preform further comprises the grinding of said first surface on an intermediate form, said grinding being performed exclusively in a direction substantially transverse to the longitudinal axis of said intermediate form.

12. The method of claim 1 further comprising the step of selecting a preform material from the group consisting of: glasses, polymers, monomers, and crystals.

13. A method for forming a cylindrical microlens having a longitudinal axis and at least one curved optical surface, the method comprising the steps of:

forming a preform by the grinding of a first surface on a preform, said first surface equivalent to said curved optical surface, said grinding being performed exclusively in a direction substantially transverse to a longitudinal axis of said preform, said longitudinal axis of said preform equivalent to said longitudinal axis of said cylindrical microlens, and said preform having a minimum drawing temperature;

heating said preform to at least said minimum drawing temperature; and responsive to said step of heating said preform, drawing said microlens from said preform, thereby selectively removing transverse tool marks left by said step of forming.

14. A method for forming a cylindrical microlens having desired optical properties, a longitudinal axis, a curved optical surface, and a desired final size, the method comprising the steps of:

forming a mold by the grinding of a first surface on said mold, said first surface equivalent to said curved optical surface, said grinding being performed exclusively in a direction substantially transverse to a longitudinal axis of said mold, said longitudinal axis of said mold equivalent to said longitudinal axis of said cylindrical microlens;

casting a preform from said mold, said preform having a minimum drawing temperature, whereby said first surface of said mold defines a first surface of said preform, said first surface of said preform equivalent to said curved optical surface of said microlens; and selectively removing transverse tool marks from said preform by drawing said preform to said desired final size, thereby forming said cylindrical microlens having the cross-sectional shape of said preform, but with cross-sectional dimensions reduced below the cross-sectional dimensions of said preform.

15. The method of claim 14 comprising the further step of heating said preform prior to said step of removing.

16. The method of claim 14 wherein said step of forming further comprises the step of grinding said first surface on an intermediate form.

17. The method of claim 14 further comprising the step of selecting a material for said preform from the group consisting of glasses, crystals, resins, polymers, and monomers.

18. The method of claim 14 applied to a cylindrical microlens having a plurality of optical surfaces, at least one of said plurality of optical surfaces being a curved optical surface, said method comprising the further steps of:

forming a mold by the grinding of each of a plurality of surfaces on said mold, said plurality of surfaces on said mold equivalent to said plurality of optical surfaces of said microlens, said grinding being performed exclusively in a direction substantially transverse to a longitudinal axis of said mold, said longitudinal axis of said mold equivalent to said longitudinal axis of said cylindrical microlens;

casting a preform from said mold, said preform having a minimum drawing temperature, whereby said plurality of surfaces of said mold define an equivalent plurality of surfaces of said preform, said plurality of surfaces of said preform thereby equivalent to said plurality of optical surfaces of said microlens.

\* \* \* \* \*

UNITED STATES PATENT AND TRADEMARK OFFICE
CERTIFICATE OF CORRECTION

PATENT NO. : 5,867,327
DATED : February 2, 1999
INVENTOR(S) : James J. Snyder

It is certified that error appears in the above-identified patent and that said Letters Patent is hereby corrected as shown below:

In the claims, in column 7, at claim 6, on line 58 after the words "axis of the preform" insert the words -- without producing longitudinal tool marks --.

Signed and Sealed this

Eighth Day of June, 1999

Attest:

Q. TODD DICKINSON

Attesting Officer

Acting Commissioner of Patents and Trademarks